June 13, 1933.    N. SKILLMAN ET AL    1,913,459
BALL STUD
Filed Dec. 20, 1929
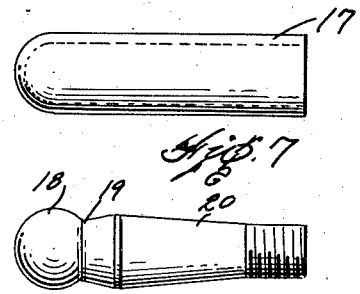
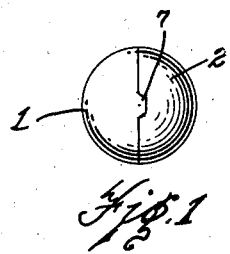
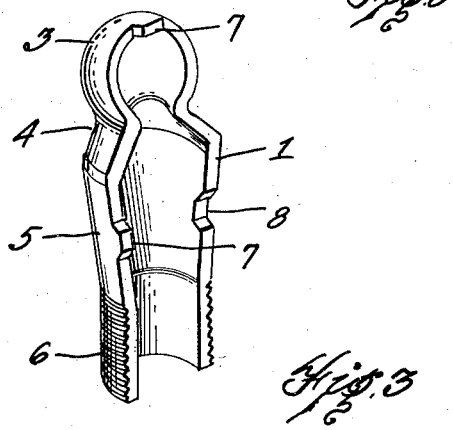
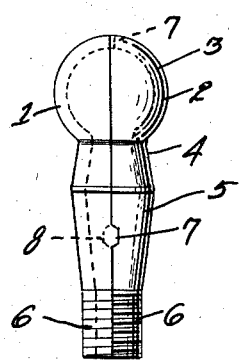
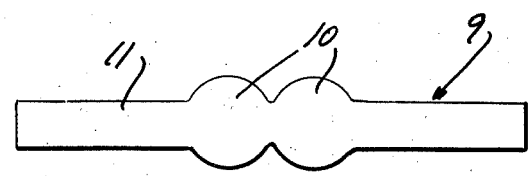
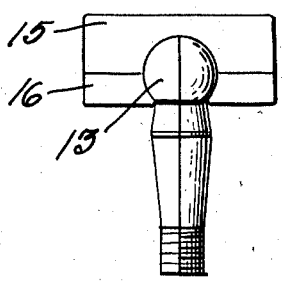
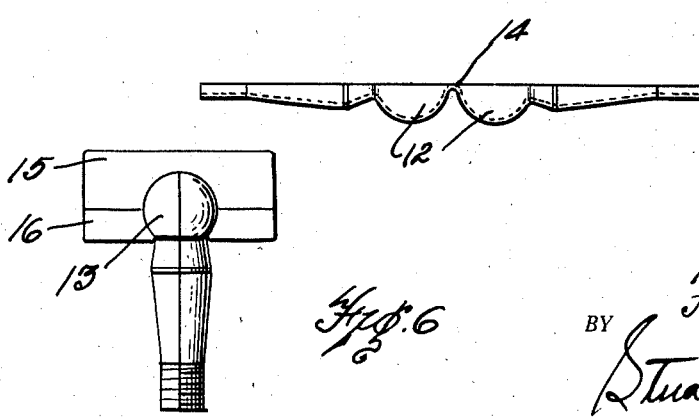
INVENTOR.
NEWTON SKILLMAN
JOSEPH P. LAVIGNE
BY
ATTORNEY.

Patented June 13, 1933

1,913,459

UNITED STATES PATENT OFFICE

NEWTON SKILLMAN AND JOSEPH P. LAVIGNE, OF DETROIT, MICHIGAN, ASSIGNORS TO O. & S. BEARING COMPANY, OF DETROIT, MICHIGAN, A CORPORATION OF MICHIGAN

BALL STUD

Application filed December 20, 1929. Serial No. 415,426.

This invention relates to a ball stud, and has to do particularly with that type of ball stud which is used in shock absorber link structure and the like.

Heretofore, ball studs of this type have been fabricated from solid stock, necessitating considerable expense in turning and shaping the same. It is the object of the present invention to provide a hollow ball stud formed from sheet metal. Such novel ball stud can be fabricated in halves or as a complete integral unit, but the main point is that it can be fabricated originally from a flat piece of sheet metal stock, thus materially reducing the cost of manufacture.

In the dawing:

Figs. 1 and 2 are plan and front elevations respectively, of one form of hollow ball stud fabricated in accordance with the present invention.

Fig. 3 is a perspective view of a half ball stud of the type shown in Figs. 1 and 2.

Fig. 4 illustrates the first step in forming a ball stud from two integral halves.

Fig. 5 illustrates the second step of stamping the sheet metal to fabricate the general shape of the ball stud.

Fig. 6 illustrates one method of finishing the contour of the ball part of the stud so as to present a perfect sphere.

Fig. 7 illustrates one of the steps in forming another type of ball stud wherein the blank is drawn originally from a round piece of flat stock.

Fig. 8 illustrates a completed ball stud formed from the drawn blank shown in Fig. 7.

As will be obvious from the figures, our novel ball stud may be fabricated in several different manners, and our preferred method of manufacture is that shown in Figs. 7 and 8, although it will be understood that we are not limited to the method shown in said figures. The main point in each case is the fact that a ball stud is provided which accomplishes all the functions of a solid standard ball stud and which is fabricated directly from flat sheet metal stock.

In the form shown in Figs. 1, 2, and 3, the ball stud is initially formed in two halves which may be generaly designated 1 and 2. The completed half 1 as it is stamped from flat sheet metal is shown in Fig. 3. In this form, the half may be formed of a semispherical head 3, of the required shape and dimensions, a neck portion 4, a tapered portion 5, and a threaded portion 6. Each half is preferably provided with suitable cooperating projections 7 or depressions 8, the purpose of these cooperating projections and depressions being to hold the two halves solid and prevent the same from shifting.

The threads 6 may be placed on the stud by holding the same assembled in a suitable chuck or other means. It will also be obvious that the pressed metal parts, having been placed together, will be held in this position by the usual taper which is formed in the link for receiving the ball stud and by the lock nut which holds the ball stud in the link, the tighter the nut the more solid will the two halves be held together.

In Figs. 4 and 5 the ball stud is shown as being formed from a single blank generally designated 9. This blank may be first cut from flat stock as shown in Fig. 4, to form the head portions 10 and the shank portions 11, and then such flat stock may be subjected to suitable die operations so as to fabricate and shape the two halves much the same as the one half shown in Fig. 3. These two halves may then be bent together, as shown in Fig. 6, so that the semi-spherical portions 12 form the ball head 13.

In so bending the halves together, it will be obvious that a small projection will be formed by the connecting part 14 of the two halves. In order to present a smooth sperical surface, the ball stud may be subjected to suitable peening or hammering dies 15 and 16. In this operation the top die 15 may be reciprocated and both the dies and work turned about a vertical axis during the peening operation. Such peening or hammering dies are of standard construction and need not be described in detail for the purpose of this invention. It will be obvious that the ball joint, as shown in Fig. 6, will be held in assembled relation, in the same manner as described in connection with the ball stud shown in Fig. 2.

In the preferred form shown in Figs. 7 and 8, the blank for the ball stud is preferably drawn from a flat circular sheet of metal to form a shell 17. This shell, of course, may be formed and drawn in several operations, but this will be understood by anyone skilled in the art. The point is that the substantially cylinder shell is preferably formed from a flat piece of stock. This shell 17 is then subjected to dies so as to form an article of the general shape shown in Fig. 8; that is, the dies will form the spherical head 18, the neck portion 19, and the tapered portion 20. If necessary, the head portion 18 may then be subjected to suitable peening dies of the type shown in Fig. 6, so as to present an absolutely smooth spherical surface. The threads may be chased on the ends of the tapered portion in the usual manner.

What we claim is:

1. A ball stud formed of two symmetrical halves, each half being formed of stamped metal and including a hemi-spherical head and tapered body portions, and means positioned at the meeting edges of said two halves and complementally fitting together upon assembly to hold the two halves against relative longitudinal and lateral movement.

2. A ball stud formed of two symmetrical halves, each half being formed of stamped metal and including a hemi-spherical head and tapered body portions, and complementally fitting means formed in the hemi-spherical portion of each half and in the tapered portion of each half for holding the two halves against relative longitudinal and lateral movement.

In testimony whereof we affix our signatures.

NEWTON SKILLMAN.
JOSEPH P. LAVIGNE.